(No Model.)
T. GOETZ.
CASTER.
No. 341,139. Patented May 4, 1886.
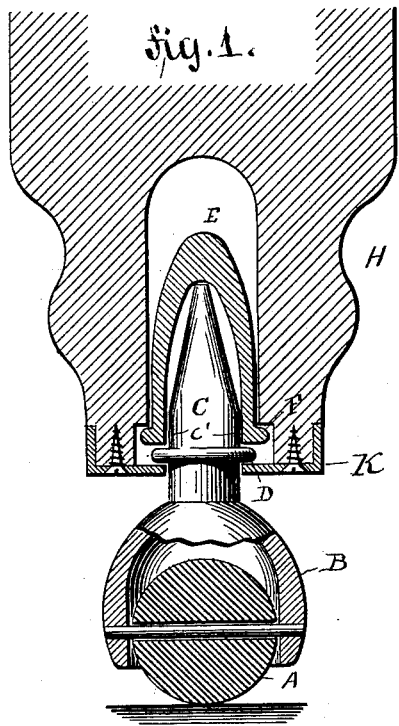
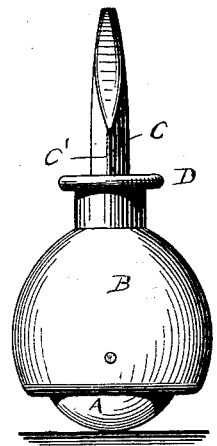
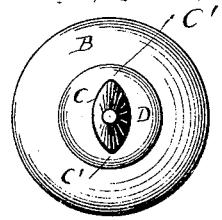
WITNESSES:
H. N. Rosenbaum.
Martin Petry.
INVENTOR
Theodor Goetz
BY Goepel & Raegener
his ATTORNEYS

UNITED STATES PATENT OFFICE.

THEODORE GOETZ, OF NEW YORK, N. Y.

CASTER.

SPECIFICATION forming part of Letters Patent No. 341,139, dated May 4, 1886.

Application filed March 4, 1886. Serial No. 193,957. (No model.)

*To all whom it may concern:*

Be it known that I, THEODORE GOETZ, a citizen of the United States, and a resident of the city of New York, in the county and State of New York, have invented certain new and useful Improvements in Casters, of which the following is a specification.

This invention relates to certain new and useful improvements in casters used on articles of furniture, &c.; and the object of the invention is to provide a new and improved caster which is so constructed as to automatically turn in such a manner that the axis of rotation of the roller is at all times at right angles to the direction at which the caster is being moved, thereby preventing the slipping of the roller, and avoiding undue friction and wear and tear of the surface on which the roller runs, all as will be fully described and set forth hereinafter, and pointed out in the claims.

In the accompanying drawings, Figure 1 is a longitudinal sectional view of my improved caster. Fig. 2 is a side view of the same, the socket for receiving the stem not being shown; and Fig. 3 is a top view of the same.

Similar letters of reference indicate corresponding parts.

The roller or ball A is pivoted in the socket or fork B. In case a ball is used, it is pivoted at two diametrically-opposite points, and in case a roller is used it is mounted in the ordinary manner on an axis.

The socket or fork B is provided with an upwardly-projecting stem, C, which is flattened and tapered toward its upper end, so that the planes of the flat sides of the stem will be approximately parallel with the pivotal axis of the roller or ball. At the lower end of the stem C knife-edges C' are formed at the sides, as shown in Fig. 2. A short distance above the socket the stem is provided with a collar, D. The stem C is passed into a socket or thimble, E, provided at its lower end with an outwardly-projecting flange, F, which thimble is passed into an aperture in the lower end of the leg H, the upper end of the flange resting against the bottom of the leg. A ring, K, is secured to the lower end of the leg H, through which ring the stem is passed in such a manner that the collar D rests on the upper surface of the ring and prevents the caster from dropping from the leg. The upper end of the stem rests against the top of the cavity of the socket E. The diameter of the socket is greater than the width of the stem, so that the latter can turn freely in the socket.

The operation is as follows: In case the table-leg is moved in the direction of the flat sides of the stem C, one of the edges C' rests against the inner sides of the socket E, and said stem has a narrow bearing-surface. The axis of the roller or ball is then parallel with the direction in which the table-leg is moved, and thus the roller and ball cannot be revolved. The friction produced causes the turning of the socket and stem on the longitudinal axis of the same, causing the flat sides of the stem to rest against the sides of the cavity of the socket E, thereby bringing the axis of the roller or ball at right angles to the direction in which the leg is moved. The roller can only slide on the floor without revolving when the axis of rotation of the roller or ball is not at right angles to the direction in which the leg is moved; but whenever said axis of rotation is not at right angles to the direction in which the leg is moved the stem or pivot swings to either side until its flat side rests against the inside of the cavity in the socket E, and thus the caster at all times adjusts itself so that the axis of the socket E is at right angles to the direction in which the leg is moved. The stem cannot bind in the socket E, as only the upper end of said stem is in contact with the socket, and thus the friction-surface is reduced to a minimum.

Having thus described my invention, I claim as new and desire to secure by Letters Patent—

1. A caster having a fork in which the roller or ball is pivoted, said fork being provided with an upwardly-projecting stem having its sides flattened, the planes of the flattened sides being parallel with the axis of rotation of the roller, substantially as shown and described.

2. In a caster, the combination, with a socket or fork in which a ball or roller is pivoted, which socket or fork has its stem flattened in the direction of the axis of rotation of the ball or roller, and which stem has its upper end pointed, of a socket for receiving the stem, the diameter of said socket being greater than the width of the stem, substantially as herein shown and described.

In testimony that I claim the foregoing as my invention I have signed my name in presence of two subscribing witnesses.

THEODORE GOETZ.

Witnesses:
OSCAR F. GUNZ,
SIDNEY MANN.